United States Patent
Otschik et al.

(10) Patent No.: US 9,657,775 B2
(45) Date of Patent: May 23, 2017

(54) BEARING COMPONENT COMPRISING AN INNER DIAMOND COATING

(71) Applicant: EagleBurgmann Germany GmbH & Co. KG, Wolfratshausen (DE)

(72) Inventors: Joachim Otschik, Beuerberg (DE); Wolfgang Berger, Benediktbeuern (DE); Michael Rieger, Egling-Deining (DE); Andreas Pehl, Poing (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 15/151,919

(22) PCT Filed: Dec. 1, 2014

(86) PCT No.: PCT/EP2014/076057
§ 371 (c)(1),
(2) Date: May 11, 2016

(87) PCT Pub. No.: WO2015/086356
PCT Pub. Date: Jun. 18, 2015

(65) Prior Publication Data
US 2017/0023058 A1  Jan. 26, 2017

(30) Foreign Application Priority Data
Dec. 10, 2013  (DE) ........................ 10 2013 225 398

(51) Int. Cl.
*F16C 33/10*  (2006.01)
*F16C 33/04*  (2006.01)
(Continued)

(52) U.S. Cl.
CPC ............ *F16C 33/043* (2013.01); *F16C 17/02* (2013.01); *F16C 17/028* (2013.01);
(Continued)

(58) Field of Classification Search
CPC .... F16C 17/02; F16C 33/103; F16C 33/1065; F16C 2206/04; F16C 2240/42
See application file for complete search history.

(56) References Cited

U.S. PATENT DOCUMENTS

| 4,756,631 A | 7/1988 | Jones |
| 2007/0047857 A1 | 3/2007 | Hamada et al. |

(Continued)

FOREIGN PATENT DOCUMENTS

| DE | 339649 C | 7/1921 |
| DE | 102009060924 A1 | 6/2011 |

(Continued)

OTHER PUBLICATIONS

International Search Report issued Feb. 20, 2015 in connection with PCT/US2014/076057.

(Continued)

*Primary Examiner* — Phillip A Johnson
(74) *Attorney, Agent, or Firm* — Locke Lord LLP; Scott D. Wofsy

(57) ABSTRACT

The invention relates to a bearing component, comprising a base body (2) and an opening (3) which is formed in the base body (2) and on which an internal bearing face is formed, the internal bearing face having a diamond coating (4), and the diamond coating (4) having elongate depressions (42) extending substantially in the longitudinal direction (X-X) of the opening.

10 Claims, 2 Drawing Sheets

Figure 1:
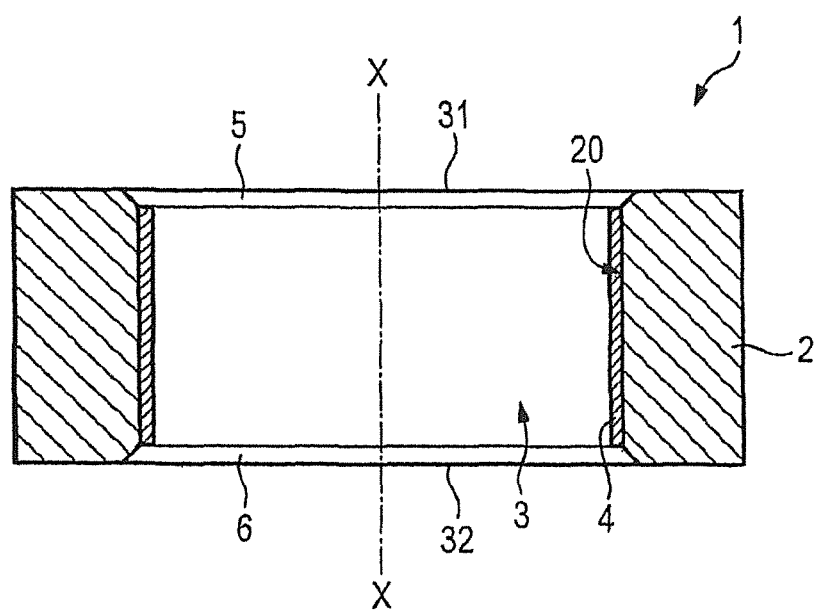

(51) Int. Cl.
*F16C 17/02* (2006.01)
*F16C 33/12* (2006.01)
(52) U.S. Cl.
CPC .......... *F16C 33/103* (2013.01); *F16C 33/124* (2013.01); *F16C 2206/04* (2013.01); *F16C 2240/42* (2013.01)

(56) References Cited

U.S. PATENT DOCUMENTS

| | | |
|---|---|---|
| 2013/0044971 A1 | 2/2013 | Cooley et al. |
| 2015/0137486 A1* | 5/2015 | Smith .............. F16C 33/1065 280/511 |

FOREIGN PATENT DOCUMENTS

| | | |
|---|---|---|
| EP | 2131049 A1 | 12/2009 |
| JP | 2002070870 A | 3/2002 |

OTHER PUBLICATIONS

Search report issued in connection with Priority Application No. DE102013225398.2.

\* cited by examiner

BEARING COMPONENT COMPRISING AN INNER DIAMOND COATING

The present invention relates to a bearing component comprising an internal bearing face which has a diamond coating.

It is known in principle in the art to provide slide rings and the like with a diamond coating from the outside. This is conventionally done by a CVD method. However, coating internal faces with diamond, for example on a bearing, is problematic. DE 108 09 675 C1 discloses a device and a method for applying diamond layers to tubular hollow bodies of limited length. In this context, filaments are passed through the hollow bodies, and are intended to bring about deposition of diamond particles on the internal faces to be coated. Diamond coating carried out by this method results in a homogeneous diamond layer on the internal face of the hollow body.

The object of the present invention is to provide a bearing component which has hydrodynamic optimisation as well as being of a simple construction and being simple and cost-effective to manufacture. In particular, a bearing component according to the invention should have as low a friction as possible even during rolling, as well as a very long service life.

This object is achieved by a bearing component having the features of claim 1. The dependent claims each disclose a preferred embodiment of the invention.

The bearing component according to the invention having the features of claim 1 has the advantage that hydrodynamic optimisation of a diamond coating provided on an internal bearing face is possible. In particular, the bearing component according to the invention makes it possible for a large number of start/stop processes to be carried out without high wear occurring at the diamond coating. As a result, the bearing component according to the invention has a long service life. This is achieved according to the invention in that the bearing component has an opening provided in a base body having a diamond-coated internal bearing face. The diamond coating of the internal bearing face has elongate depressions which extend substantially in the longitudinal direction of the opening in the base body. The elongate depressions are provided in the diamond coating itself. The elongate depressions thus extend substantially perpendicular to the circumferential direction of the internal bearing face, in other words in the axial direction of the bearing component. The elongate depressions are achieved by way of substantially linear crystal structures. As a result, it is very effectively and unexpectedly achieved that a pressure gradient is possible during rolling on the bearing, and greatly reduces a lift rotational speed until complete hydrodynamic operation. In other words, the rotational speed at which the friction transitions from the original static friction in the stationary state of the bearing via the boundary friction to complete fluid friction is much lower than in the art. The earlier lifting of the rotating component from the bearing face also results in greatly reduced wear, meaning that the service life of the bearing component can be significantly increased.

The opening in the base body is preferably a through-opening.

Also preferably, the elongate depressions in the diamond coating extend continuously from a first side to a second side of the opening. This assists the pressure build-up during a starting process on the bearing component, in such a way that low-friction fluid friction can be built up particularly rapidly in the bearing component.

Also preferably, the elongate depressions in the diamond coating do not cross one another. Particularly preferably, the elongate depressions are formed substantially parallel. Since the elongate depressions are formed by crystal structures of the diamond coating, the elongate depressions do not have straight walls or the like, meaning that according to the invention the term of extending substantially parallel is used.

Also preferably, adjacent elongate depressions in the diamond coating are at approximately equal distances in the circumferential direction of the opening. This makes a rapid pressure build-up possible in all positions when a rotating component arranged in the bearing component is rolling.

Also preferably, the width of the elongate depressions as determined in the circumferential direction of the opening is less than an average width of the diamond crystals on the surface of the diamond coating. As a result, a narrow elongate channel through the elongate depressions of the diamond coating is provided.

Also preferably, the ratio of the depth to the width of the elongate depression is approximately two. Particularly preferably, the depth of the elongate depressions is approximately 2 μm. Also preferably, the width of the elongate depressions is approximately 1 μm. Also preferably, the thickness of the diamond coating is approximately 8 μm to 20 μm.

According to a further preferred embodiment of the present invention, the width of the elongate depressions in the diamond coating and the depth of the elongate depressions in the diamond coating are substantially constant. It should also be noted in this connection that the term "substantially" is dependent on the crystal form of the diamond surface coating, since it is not possible to specify exact dimensions in the μm range in this context.

When a rotating component is rolling in the bearing component, the elongate depressions are preferably filled with a lubricating medium, for example a fluid, in such a way that during the rolling process the rotation of the rotating component causes the lubricating fluid present in the elongate depressions to form a lubricating fluid wall, in such a way that fluid molecules entrained by the rolling process accumulate on the lubricating fluid wall and the bearing thus rapidly transitions into the state of fluid friction.

The bearing component is preferably made of SiC or WC.

Also preferably, the entire opening of the base body is coated with diamond.

In a particularly preferred embodiment of the present invention, the bearing component is formed as a radial slide bearing.

Figure 2:
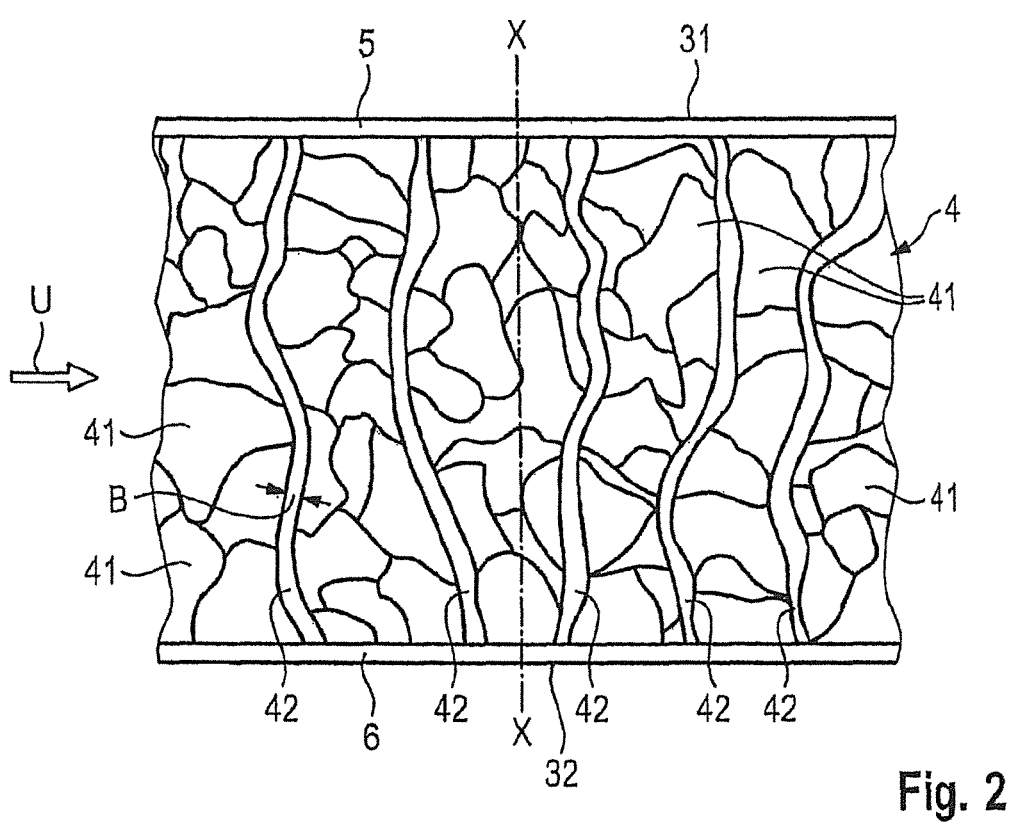

In the following, the invention is described in detail with reference to the accompanying drawings, in which:

FIG. 1 is a schematic sectional view of a bearing component according to the invention, and FIG. 2 is a schematic plan view of the surface of the diamond coating of the internal bearing face of an opening of the bearing component.

As can be seen from the sectional view of a bearing component 1 according to the present invention, the bearing component 1 comprises a base component 2 comprising an opening 3. The opening 3 of this embodiment is formed as a through-opening.

The opening 3 is provided to be cylindrical and has a diamond coating 4 on an internal bearing face 20 of the base body 2. The diamond coating 4 is formed on the entire internal bearing face 20 of the opening 3.

The opening 3 is formed as an internal bearing face and is for receiving for example a shaft which is mounted in the opening 3 so as to be rotatable in both circumferential directions.

Further, a first bevel 5 is formed on a first side 31 of the opening 3 and a second bevel 6 is formed on a second side 32 of the opening 3. The bearing component 1 of this embodiment is formed as a radial sliding bearing.

FIG. 2 is an enlarged, detailed view of a surface of the diamond coating 4. As can be seen from FIG. 2, a large number of diamond crystals 41 are formed on the surface of the diamond coating 4. Further, elongate depressions 42 are formed on the surface of the diamond coating 4 and extend continuously from the first side 31 to the second side 32. The elongate depressions 42 are thus provided so as to be continuous in the axial direction X-X on the surface of the diamond coating 4.

The elongate depressions 42 are of a width B, as measured in the circumferential direction, which is substantially constant along the length of the elongate depressions 42. As is clear from FIG. 2, the elongate depressions 42 are formed between the diamond crystals 41, in such a way that the elongate depressions 42 do not have straight walls and floors, but are instead formed in accordance with the crystal growth. However, the width B may substantially be considered substantially constant over the length of the elongate depressions 42.

The elongate depressions 42 are formed substantially perpendicular to the circumferential direction U. Further, the elongate depressions 42 are of a depth such that the ratio of the depth to the width remains substantially constant over the entire length of the elongate depression 42 and is approximately two. The width B of the elongate depression 42 is approximately 1 µm and the depth of the elongate depression 42 is approximately 2 µm.

The bearing shown in the embodiment is a radial sliding bearing, a lubricant, for example lubricating oil, being present on the diamond surface. As a result of the elongate depressions 42 in the diamond coating 4, it is now provided that the lubricant is also present in the elongate depressions 42. During the rolling of a rotating component, during which static friction initially applies in the stationary state, rotation of the rotating component now results in a movement of molecules of the lubricant along the circumferential direction U. The lubricant located in each of the elongate depressions 42 acts as a lubricant wall, meaning that the molecules accumulate on the lubricant wall thus formed and can thus rapidly form a lubricant film. As a result, it is very effectively and unexpectedly achieved that a pressure gradient is built up in such a way that a lift rotational speed, at which the rotating component is no longer in direct contact with the diamond coating, can be significantly reduced. Thus, according to the invention, a transition from static friction to fluid friction can occur at a lower rotational speed of the rotating component.

The present invention is thus particularly suitable in applications where more frequent start/stop operation is involved. The unexpected results obtainable as a result of the elongate depressions 42 being provided in the diamond coating 4 thus make possible a considerable improvement to bearing components comprising a diamond internal coating.

LIST OF REFERENCE NUMERALS

1 Bearing component
2 Base body
3 Opening
4 Diamond coating
5 Bevel
6 Bevel
20 Internal bearing face
31 First side
32 Second side
41 Diamond crystal
42 Elongate depression
B Width
U Circumferential direction
X-X Axial direction

The invention claimed is:

1. Bearing component, comprising:
a base body, and
an opening which is formed in the base body and on which an internal bearing face is formed,
wherein the internal bearing face has a diamond coating; and
wherein the diamond coating has elongate depressions which are provided in the diamond coating and extend substantially in the longitudinal direction (X-X) of the opening, and wherein the width (B) of the elongate depressions is less than an average width of the diamond crystals of the diamond coating.

2. Bearing component according to claim 1, wherein the opening is a through-opening.

3. Bearing component according to claim 1, wherein the elongate depressions extend continuously from a first side to a second side of the opening.

4. Bearing component according to claim 1, wherein the elongate depressions are provided in the diamond coating without crossings.

5. Bearing component according to claim 1, wherein the elongate depressions extend substantially mutually parallel.

6. Bearing component according to claim 1, wherein the elongate depressions are provided at approximately equal distances along an internal circumference of the opening.

7. Bearing component according to claim 1, wherein the ratio of the depth of the elongate depressions to the width of the elongate depressions is approximately two.

8. Bearing component according to claim 1, wherein the elongate depressions are filled with a liquid lubricant.

9. Bearing component according to claim 1, wherein the internal bearing face of the base body is completely covered with the diamond coating.

10. Bearing component according to claim 1, wherein the bearing component is a radial sliding bearing.

* * * * *